United States Patent
Ashley (10) Patent No.: US 9,258,269 B1
(45) Date of Patent: Feb. 9, 2016

(54) METHODS AND SYSTEMS FOR MANAGING DELIVERY OF EMAIL TO LOCAL RECIPIENTS USING LOCAL REPUTATIONS

(75) Inventor: Peter Ashley, Hopkinton, MA (US)

(73) Assignee: Symantec Corporation, Mountain View, CA (US)

(*) Notice: Subject to any disclaimer, the term of this patent is extended or adjusted under 35 U.S.C. 154(b) by 604 days.

(21) Appl. No.: 12/411,146

(22) Filed: Mar. 25, 2009

(51) Int. Cl.
H04L 29/12 (2006.01)
H04L 29/06 (2006.01)

(52) U.S. Cl.
CPC ............ *H04L 61/1511* (2013.01); *H04L 63/14* (2013.01)

(58) Field of Classification Search
CPC .............. H04L 51/12; H04L 29/12066; H04L 61/1511; H04L 12/58; H04L 63/14; H04L 43/16; G06F 21/55
USPC ........................................ 709/206, 207, 217
See application file for complete search history.

(56) References Cited

U.S. PATENT DOCUMENTS

| | | | | |
|---|---|---|---|---|
| 6,154,777 | A * | 11/2000 | Ebrahim | 709/227 |
| 7,181,204 | B2 * | 2/2007 | Alfano | H04W 48/18 370/349 |
| 7,444,371 | B2 * | 10/2008 | Douglis et al. | 709/203 |
| 7,487,217 | B2 * | 2/2009 | Buckingham | H04L 12/585 709/206 |
| 7,552,176 | B2 * | 6/2009 | Atkinson et al. | 709/206 |
| 7,653,695 | B2 * | 1/2010 | Flury | H04L 12/585 709/206 |
| 7,668,951 | B2 * | 2/2010 | Lund | G06Q 10/107 709/204 |
| 7,673,058 | B1 * | 3/2010 | White et al. | 709/229 |
| 7,725,536 | B2 * | 5/2010 | Douglis et al. | 709/203 |
| 7,849,142 | B2 * | 12/2010 | Clegg et al. | 709/206 |
| 7,849,502 | B1 * | 12/2010 | Bloch | H04L 12/2602 726/11 |
| 7,870,200 | B2 * | 1/2011 | Slater et al. | 709/206 |
| 7,908,328 | B1 * | 3/2011 | Hulten | H04L 12/585 709/204 |
| 7,996,475 | B2 * | 8/2011 | Drako et al. | 709/206 |
| 8,255,987 | B2 * | 8/2012 | Bono | H04L 12/585 713/155 |
| 8,392,357 | B1 * | 3/2013 | Zou | H04L 63/1416 707/602 |
| 8,601,577 | B1 * | 12/2013 | Ashley | H04L 51/12 726/22 |
| 8,613,064 | B1 | 12/2013 | Roy | |
| 8,650,245 | B1 * | 2/2014 | Ashley | H04L 51/12 709/203 |
| 8,776,196 | B1 * | 7/2014 | Oliver | H04L 63/1483 726/11 |
| 2003/0172291 | A1 * | 9/2003 | Judge | G06F 21/554 726/1 |

(Continued)

OTHER PUBLICATIONS

"GOSSiP Frequently Asked Questions"; (accessed on May 14, 2009); http://sufficiently-advanced.net/faq.html.

(Continued)

*Primary Examiner* — Backhean Tiv
(74) *Attorney, Agent, or Firm* — ALG Intellectual Property, LLP (57) ABSTRACT

A computer-implemented method for managing delivery of email to local recipients. The computer-implemented method may include establishing a local reputation for an email sender address. The method may include storing a domain-name-system record associated with the local reputation on a domain-name system. The domain-name system may be mail-transfer agent agnostic. The method may also include identifying one or more emails sent from the email sender address to one or more local recipients. The method may include forming a spam verdict for each of the one or more emails by analyzing contents of each of the one or more emails. The method may additionally include updating the local reputation for the email sender address based on the one or more spam verdicts.

20 Claims, 7 Drawing Sheets

(56) References Cited

U.S. PATENT DOCUMENTS

| | | | |
|---|---|---|---|
| 2005/0193076 A1* | 9/2005 | Flury | H04L 12/585 709/206 |
| 2005/0198159 A1* | 9/2005 | Kirsch | H04L 51/12 709/206 |
| 2005/0216587 A1* | 9/2005 | John | H04L 63/101 709/225 |
| 2006/0010215 A1* | 1/2006 | Clegg et al. | 709/206 |
| 2006/0020672 A1* | 1/2006 | Shannon | G06Q 10/107 709/206 |
| 2006/0059238 A1* | 3/2006 | Slater et al. | 709/206 |
| 2006/0095404 A1* | 5/2006 | Adelman | G06F 17/30867 |
| 2006/0095459 A1* | 5/2006 | Adelman | H04L 12/585 |
| 2006/0179113 A1* | 8/2006 | Buckingham | H04L 12/585 709/206 |
| 2006/0212925 A1* | 9/2006 | Shull | G06F 21/55 726/1 |
| 2006/0277259 A1* | 12/2006 | Murphy | H04L 51/12 709/206 |
| 2006/0277264 A1* | 12/2006 | Rainisto | H04L 51/12 709/206 |
| 2007/0027992 A1* | 2/2007 | Judge | G06Q 10/107 709/227 |
| 2007/0124487 A1* | 5/2007 | Yoshimoto et al. | 709/230 |
| 2007/0143469 A1* | 6/2007 | Adams | G06Q 10/107 709/224 |
| 2007/0180090 A1* | 8/2007 | Fleischman | H04L 29/12066 709/223 |
| 2007/0271343 A1* | 11/2007 | George | G06Q 10/107 709/206 |
| 2008/0028100 A1* | 1/2008 | Adelman | G06Q 10/107 709/245 |
| 2008/0184366 A1* | 7/2008 | Alperovitch | H04L 51/12 726/22 |
| 2008/0282338 A1* | 11/2008 | Beer | G06F 21/566 726/12 |
| 2009/0037546 A1* | 2/2009 | Kirsch | G06Q 10/107 709/206 |
| 2009/0113016 A1* | 4/2009 | Sen | G06Q 10/107 709/207 |
| 2009/0222917 A1* | 9/2009 | Mills | H04L 51/12 726/22 |
| 2009/0248814 A1* | 10/2009 | Kelly | H04L 51/12 709/206 |
| 2009/0259725 A1* | 10/2009 | Rabinovich | G06Q 10/107 709/206 |
| 2009/0327430 A1* | 12/2009 | Colvin | G06Q 10/107 709/206 |
| 2010/0005146 A1* | 1/2010 | Drako et al. | 709/206 |
| 2010/0017360 A1* | 1/2010 | Bansal et al. | 707/1 |
| 2010/0100957 A1* | 4/2010 | Graham | G06Q 10/107 726/22 |
| 2010/0106833 A1* | 4/2010 | Banerjee et al. | 709/226 |
| 2010/0131646 A1* | 5/2010 | Drako | H04L 29/12066 709/225 |
| 2010/0153394 A1* | 6/2010 | Wood | G06Q 10/107 707/737 |
| 2010/0161537 A1* | 6/2010 | Liu | H04L 41/142 706/46 |
| 2010/0180333 A1* | 7/2010 | Bono | H04L 12/585 726/13 |
| 2010/0185739 A1* | 7/2010 | Shuster | H04L 51/12 709/206 |
| 2012/0084860 A1 | 4/2012 | Cao et al. | |
| 2012/0167233 A1* | 6/2012 | Gillum | H04L 12/585 726/29 |

OTHER PUBLICATIONS

"The GOSSiP Project"; (accessed May 14, 2009); http://www.sufficiently-advanced.net/.

"The Spamhaus Block List"; (accessed May 21, 2009); http://www.spamhaus.org/sbl/index.lasso.

"Cloudmark Service and Razor-Agents"; (accessed May 21, 2009); Couldmark; http://www.cloudmark.com/policies/razor/.

"Products"; (accessed May 21, 2009); Bizanga; http://www.bizanga.com/products/index.php.

"IronPort Anti-Spam"; (accessed May 21, 2009); Cisco; http://ironport.com/products/ironport_antispam.html.

Nishant Doshi, et al; Systems and Methods for Detecting and Preventing Phishing Attacks; U.S. Appl. No. 12/402,863, filed Mar. 12, 2009.

Oleg Kislyuk, et al; Systems and Methods for Detecting Suspicious Web Pages; U.S. Appl. No. 12/857,119, filed Aug. 16, 2010.

Michael Hart, et al; Systems and Methods for Classifying Documents for Data Loss Prevention; U.S. Appl. No. 13/405,293, filed Feb. 25, 2012.

Jim Casaburi, et al; Systems and Methods for Securing Internet Access on Restricted Mobile Platforms; U.S. Appl. No. 13/231,919, filed Sep. 13, 2011.

Michael Hart; Systems and Methods for Transparent Data Loss Prevention Classifications; U.S. Appl. No. 13/633,846, filed Oct. 2, 2012.

Kevin Roundy; Systems and Methods for Using User-Input Information to Identify Computer Security Threats; U.S. Appl. No. 14/033,777, filed Sep. 23, 2013.

Fanglu Guo, et al; Systems and Methods for Reducing False Positives When Using Event-Correlation Graphs to Detect Attacks on Computing Systems; U.S. Appl. No. 14/031,044, filed Sep. 19, 2013.

Deb Banerjee; Systems and Methods for Enforcing Secure Network Segmentation for Sensitive Workloads; U.S. Appl. No. 13/945,373, filed Jul. 18, 2013.

Anand Kashyap, et al; Systems and Methods for Protecting Organizations Against Spear Phishing Attacks; U.S. Appl. No. 14/262,422, filed Apr. 25, 2014.

Peter Ashley; Systems and Methods for Detecting Suspicious Internet Addresses; U.S. Appl. No. 14/324,824, filed Jul. 7, 2014.

"BrightCloud", http://www.brightcloud.com/, as accessed May 19, 2014, (2004).

"ESET", http://www.eset.com/us/, as accessed May 19, 2014, (2008).

Yadav, Sandeep, et al., "Detecting Algorithmically Generated Malicious Domain Names", http://citeseerx.ist.psu.edu/viewdoc/download?doi=10.1.1.221.1167&rep=rep1&type=pdf, as accessed May 19, 2014, IMC'10, Melbourne, Australia, (Nov. 1-3, 2010).

Chong, Christophe, et al., "Malicious URL Detection", http://www.cs.berkeley.edu/~jtma/papers/beyondbl-kdd2009.pdf, as accessed May 19, 2014, (2009).

Garera, Sujata, et al., "A Framework for Detection and Measurement of Phishing Attacks", http://www.cs.jhu.edu/~sdoshi/index_files/p1-garera.pdf, as accessed May 19, 2014, WORM'07, Alexandria, Virginia, USA, (Nov. 2, 2007).

Cohen, William W., et al., "A Comparison of String Distance Metrics for Name-Matching Tasks", https://www.cs.cmu.edu/~pradeepr/papers/ijcai03.pdf, as accessed May 19, 2014, American Association for Artificial Intelligence, (2003).

Michael Hart, et al.; A System to identify machines infected by Malware Applying Linguistic Analysis; U.S. Appl. No. 14/226,626, filed Mar. 26, 2014.

* cited by examiner

METHODS AND SYSTEMS FOR MANAGING DELIVERY OF EMAIL TO LOCAL RECIPIENTS USING LOCAL REPUTATIONS

BACKGROUND

Conventional email systems may use mail-transfer agents to regulate delivery of email to recipients supported by the email system. For example, internet service providers may utilize large email processing data centers that include mail-transfer agents for managing the transfer of emails to consumers. Such email systems may interface with domain-name systems that contain information, such as reputation information, associated with known email sender addresses. Such reputation information may indicate email sender addresses that have sent spam and other undesirable emails in the past. Domain-name systems may be updated periodically by global reputation systems that are located external to the email systems.

Conventional domain-name systems may not allow for re-sampling of email sent from various email sender addresses. Rather, such domain-name systems may rely heavily on cached data that is updated only periodically by external reputation sources. Accordingly, email addresses and associated records stored on the domain-name systems may be updated relatively infrequently, resulting in out-of-date information being provided to mail-transfer agents. Additionally, conventional domain-name systems may not update stored records based on local feedback from mail-transfer agents.

In addition, mail-transfer agents are frequently configured to work only with specific types of existing domain-name system protocols. Some email database systems may be configured to enable information associated with email addresses to be managed and updated in accordance with local email traffic sent to local mail-transfer agents. However, such email systems may operate in accordance with protocols that differ from conventional domain-name system protocols, requiring conventional mail-transfer agents to be modified (or replaced with proprietary mail-transfer agents) in order to work with such customized systems.

SUMMARY

As will be described in greater detail below, the instant disclosure generally relates to systems and methods for managing delivery of email to local recipients. Embodiments of the present disclosure may establish local reputations for email sender addresses associated with email directed to local recipients. In some examples, the local reputations may initially be established based on reputation information and/or spam verdicts from external sources, such as global reputation sources. In additional examples, the local reputations may subsequently be updated based on local feedback information. For example, emails sent to local recipients may be scanned by local mail-transfer agents to form spam verdicts. The spam verdicts may be then be used to update the local reputations.

Embodiments of the present disclosure may also enable mail-transfer agents to dynamically interact with domain-name system databases without requiring the mail-transfer agents to be reconfigured to work with non-standard email address database protocols. For example, a mail-transfer agent may submit a standard request for information regarding an email address to a domain-name system or a domain-name-system proxy. Such a request may include, for example, an internet protocol address associated with the email sender. In response, the domain-name system or a domain-name-system proxy may either send, or refrain from sending, a record associated with the email sender address to the mail-transfer agent.

The decision whether or not to send the record may be determined by a policy that is based on a local reputation associated with the email sender address. When a record associated with the email sender address is not sent to the mail-transfer agent, the mail-transfer agent may analyze one or more emails sent by the email sender address and form spam verdicts for the emails based on the analysis. The domain-name system or the domain-name-system proxy may then update a local reputation for the email sender address based on the spam verdicts. Accordingly, the systems described in the present disclosure may enable local sampling of emails and updating of local reputations associated with email sender addresses.

In some embodiments, a domain-name-system proxy may maintain local reputations associated with email sender addresses. In some examples, the mail-transfer agent may send a query to the domain-name-system proxy requesting information regarding an email sender. The domain-name-system proxy may obtain the information from a domain-name system. The domain-name-system proxy may then determine, based on the local reputation, whether or not to send the information associated with the email sender to the mail-transfer agent. Accordingly, the domain-name-system proxy may facilitate local sampling of emails and updating of local reputations associated with email sender addresses. In at least one embodiment, the domain-name system proxy may be configured to work with conventional types of mail-transfer agents and/or domain-name systems to manage and periodically update local reputations in a dynamic manner.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure generally relates to methods and systems for managing delivery of email to local recipients. The methods and systems disclosed herein may dynamically interact with a domain-name system to identify and/or update records associated with email addresses. The methods and systems disclosed herein may additionally implement periodic sampling of emails sent from known email sender addresses in order to facilitate updating and/or rehabilitation of email sender reputations. In some examples, updated reputations may be stored on the domain-name system or a domain-name system proxy. As a result, embodiments of the present disclosure may enable more dynamic updating of domain-name system records based on local filtering and feedback.

Additionally, the methods and systems disclosed herein may be integrated with existing domain-name systems and mail-transfer agents without changing the manner in which the mail-transfer agents query the domain-name systems for information about email sender addresses. Accordingly, various embodiments of the present disclosure may be readily implemented with existing domain-name systems to provide dynamic management of reputations and/or records associated with email sender addresses.

Figure 2:
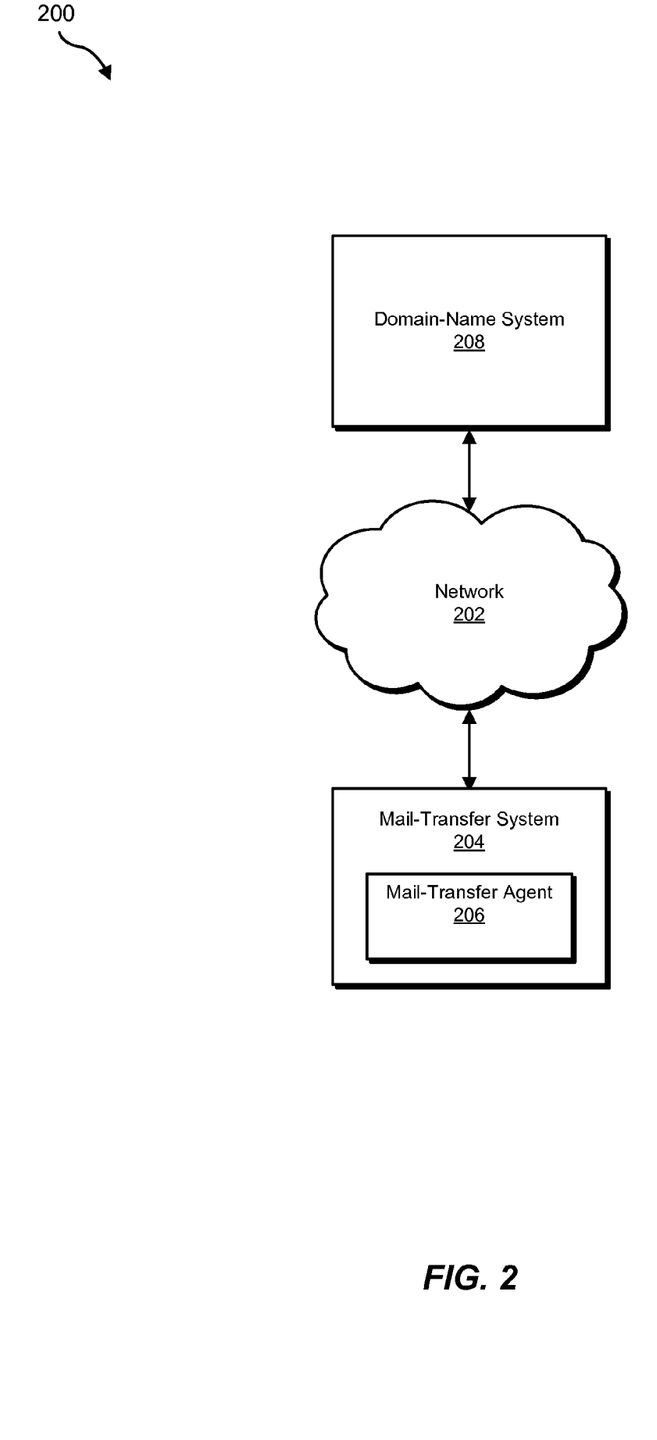
FIG. 2 is another block diagram of an exemplary system for managing delivery of email to local recipients according to certain embodiments.
Figure 3:
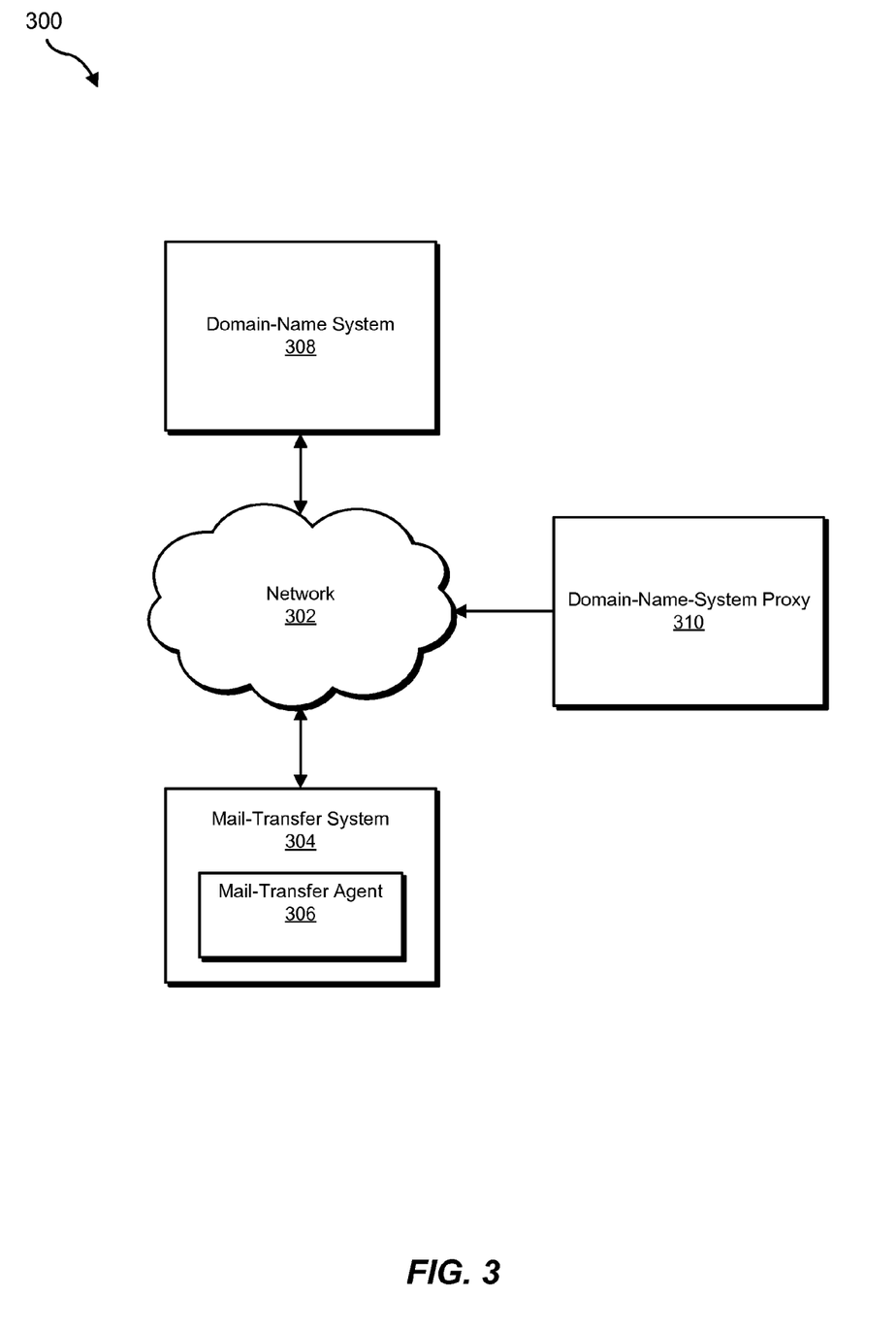
FIG. 3 is another block diagram of an exemplary system for managing delivery of email to local recipients according to certain embodiments.

As used herein, the phrase "local" may be used in reference to computing devices, systems, and/or servers comprising at least a portion of the exemplary systems described in this disclosure (e.g., exemplary systems 200 and 300 in FIGS. 2 and 3). The phrase "local" may also refer to computing devices, systems, servers, and/or computing device users for which email delivery is managed by the exemplary systems described in this disclosure. The phrase "local" may additionally refer to data stored on such exemplary systems. For example, a local mail-transfer system described in this disclosure may manage delivery of email to local recipients having email recipient addresses located on one or more local computing devices. Additionally, as used herein, the phrase "external" may be used in reference to computing devices, systems, servers, computing device users, and/or data that are located external to the exemplary systems described in this disclosure, and for which email delivery is not managed by the exemplary systems described in this disclosure.

Figure 1:
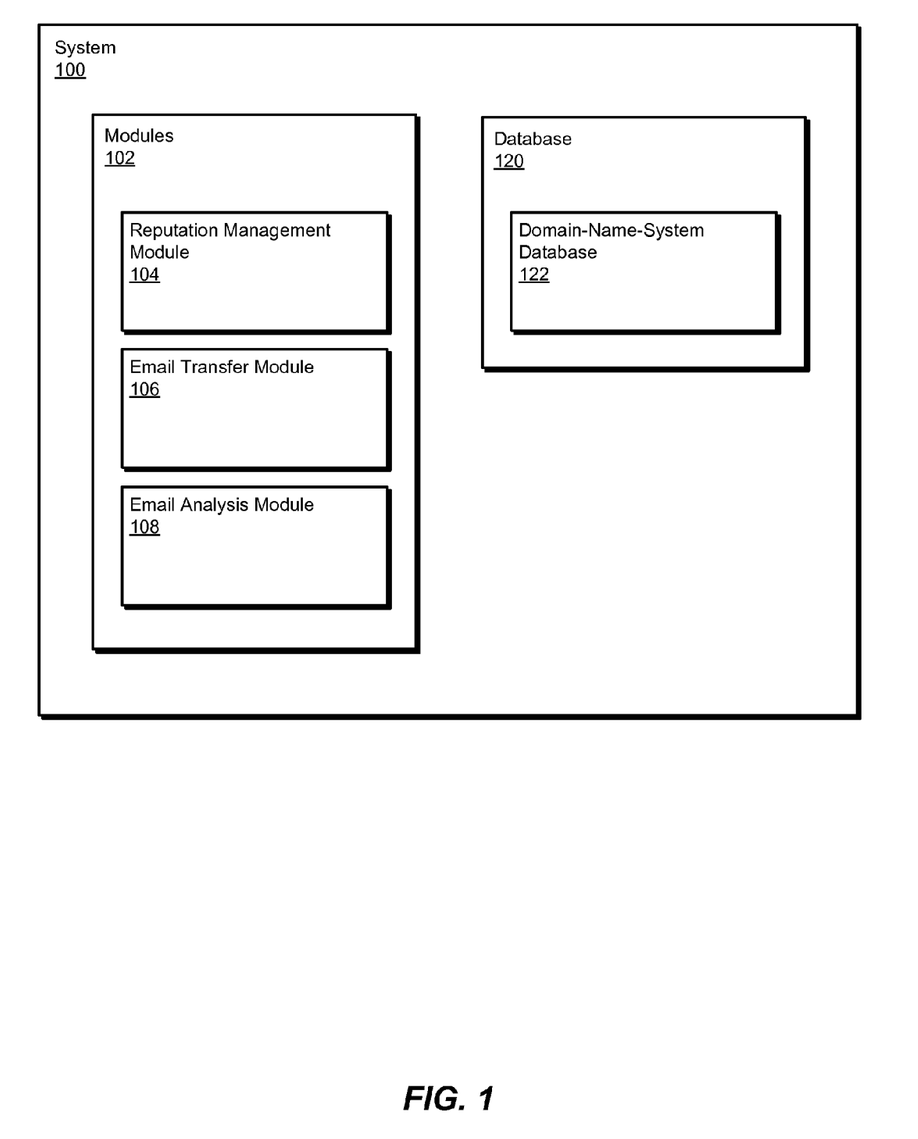
FIG. 1 is a block diagram of an exemplary system for managing delivery of email to local recipients according to certain embodiments.

FIG. 1 is a block diagram of an exemplary system 100 for managing delivery of email to local recipients. As illustrated in this figure, exemplary system 100 may comprise one or more modules 102 for performing one or more tasks. For example, and as will be explained in greater detail below, exemplary system 100 may comprise a reputation-management module 104 programmed to establish a local reputation for an email sender address. Reputation-management module 104 may be programmed to receive, from a mail-transfer agent, a request for a domain-name-system record (e.g., an "A" record) that is associated with the local reputation. Reputation-management module 104 may also be programmed to identify the domain-name-system record associated with the local reputation.

In some embodiments, reputation-management module 104 may be programmed to identify the local reputation associated with the domain-name-system record. Reputation-management module 104 may also be programmed to determine, based on the local reputation, whether to send the domain-name-system record to the mail-transfer agent. In various embodiments, reputation-management module 104 may be programmed to update the local reputation for an email sender address based on local feedback information, such as local spam verdicts obtained by analyzing emails directed to local recipients.

Exemplary system 100 may also comprise an email-transfer module 106 programmed to identify one or more emails sent from the email sender address to one or more local recipients. An email sender address may refer to any suitable identifier of a location from which an email is sent. Examples of an email sender address include, without limitation, an internet protocol address, an internet protocol address range, a domain name, and or a sender identity.

As will be described in greater detail below, exemplary system 100 may also comprise an email-analysis module 108 programmed to form a spam verdict for emails by analyzing contents of the emails. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing devices in systems illustrated in FIGS. 2 and 3 (e.g., mail-transfer system 204, domain-name system 208, domain-name-system proxy 310), computing system 610 in FIG. 6, and/or portions of exemplary network architecture 700 in FIG. 7. One or more of modules 102 in FIG. 1 may also represent all or portions of one or more special-purpose computers configured to perform one or more tasks.

In additional embodiments, exemplary system 100 may comprise a database 120 for storing data generated and/or used by exemplary system 100. For example, database 120 may comprise a domain-name-system database 122 for storing email sender addresses and corresponding records associated with the email sender addresses. In some examples, domain-name-system database 122 may store domain-name-system records associated with the local reputations for email sender addresses. In some embodiments, domain-name-system database 122 may also store local reputations for email sender addresses. Domain-name-system database 102 may be located on a domain-name system that is mail-transfer agent agnostic.

FIG. 2 is a block diagram of an exemplary system 200 for managing delivery of email to local recipients. As illustrated in this figure, exemplary system 200 may comprise a mail-transfer system 204 in communication with a domain-name system 208 via a network 202. According to some embodiments, exemplary system 200 may comprise a local system configured to manage delivery of email to local recipients. For example, exemplary system 200 may comprise a system utilized by an internet service provider to manage delivery of mail to recipients serviced by the internet service provider. The recipients may include, for example, consumers and/or businesses for which email delivery is managed by the internet service provider. In other embodiments, exemplary system 200 may be utilized by any other enterprise that manages mail delivery.

Mail-transfer system 204 may represent any type or form of system comprising one or more computing devices configured to manage delivery of email to recipients serviced by mail-transfer system 204. Examples of computing devices in mail-transfer system 204 include, without limitation, laptops, desktops, servers, cellular phones, personal digital assistants (PDAs), multimedia players, embedded systems, combinations of one or more of the same, exemplary computing system 610 in FIG. 6, or any other suitable computing device. Examples of servers in mail-transfer system 204 include, without limitation, application servers and database servers configured to provide various database services and/or run certain software applications.

Mail-transfer system 204 may include a mail-transfer agent 206 that is capable of interacting with domain-name system 208 via network 202. Mail-transfer agent 206 may also interact with external mail-transfer systems. For example, mail-transfer agent 206 may receive emails sent from mail-transfer agents located external to mail-transfer system 204. Mail-transfer agent 206 may transmit and/or inhibit transmission of emails to computers regulated by mail-transfer system 204. Additionally, mail-transfer agent 206 may transmit and/or inhibit transmission of emails from computers regulated by mail-transfer system 204 to mail-transfer agents located external to mail-transfer system 204.

Domain-name system 208 may comprise a system this be capable of communicating with mail-transfer system 204 via network 202 and may include one or more computing devices. Examples of computing devices in domain-name system 208 include, without limitation, laptops, desktops, servers, cellular phones, personal digital assistants (PDAs), multimedia players, embedded systems, combinations of one or more of the same, exemplary computing system 610 in FIG. 6, or any other suitable computing device. Examples of servers in domain name system 208 include, without limitation, application servers and database servers configured to provide various database services and/or run certain software applications.

According to various embodiments, domain-name system 208 may include an index of email sender addresses. In some embodiments, email sender addresses may include internet protocol addresses of domain names used by email senders. Domain-name system 208 may also include records associated with indexed email sender addresses. In some examples, domain-name system 208 may be queried for information regarding an email sender address. In response, domain-name system 208 may return a record associated with the email sender address.

Network 202 generally represents any medium or architecture capable of facilitating communication or data transfer. Examples of network 202 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 202 may facilitate communication or data transfer using wireless or wired connections. In one embodiment, network 202 may facilitate communication between mail-transfer system 204 and domain-name system 208.

FIG. 3 is a block diagram of an exemplary system 300 for managing delivery of email to local recipients. As illustrated in this figure, exemplary system 300 may comprise a mail-transfer system 304 in communication with a domain-name system 308 via a network 302. Mail-transfer system 304 may also include a mail-transfer agent 306.

In some embodiments, exemplary system 300 may also comprise a domain-name-system proxy 310. Domain-name-system proxy 310 may represent any type or form of system and/or computing device that is capable of communicating with mail-transfer system 304 and/or domain-name system 308 via network 302. In contrast to system 200 illustrated in FIG. 2, in system 300, mail-transfer system 304 may interact with domain-name-system proxy 310 instead of interacting directly with domain-name system 308. For example, mail-transfer agent 306 may interact with domain-name-system proxy 310 via network 302, and domain-name-system proxy 310 may interact with domain-name system 308 via network 302.

Figure 4:
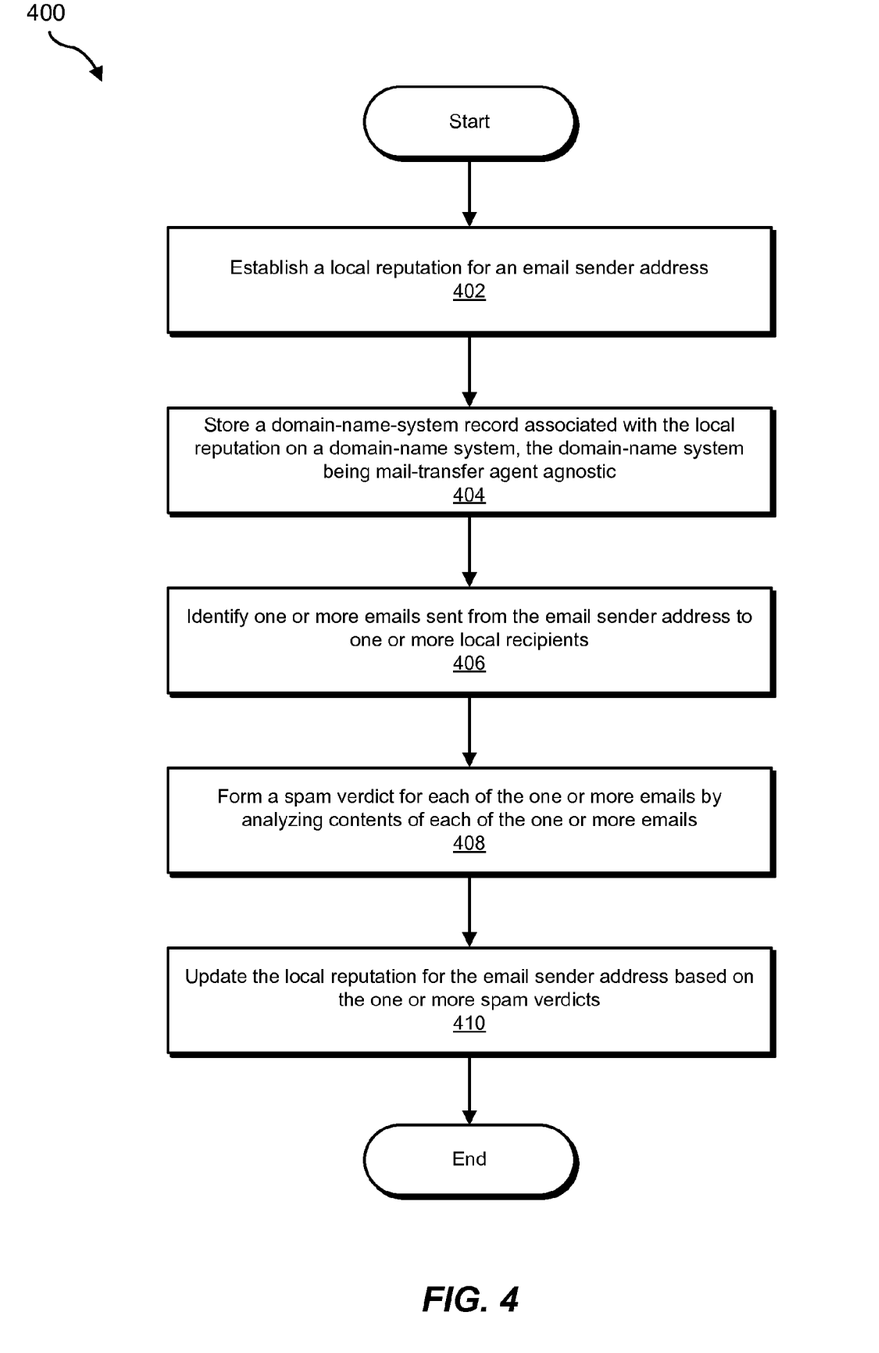
FIG. 4 is a flow diagram of an exemplary method for managing delivery of email to local recipients according to certain embodiments.

FIG. 4 is a flow diagram of an exemplary method for managing delivery of email to local recipients. As shown, a reputation-management module, such as reputation-management module 104 shown in FIG. 1, may establish a local reputation for an email sender address (step 402). The reputation-management module may establish the local reputation using any suitable technique. For example, the reputation-management module may compile information about the email sender address. The information may be derived from local and/or external sources.

In some embodiments, the reputation-management module may obtain information about the email sender address from sources external to a local system. In at least one example, information received by the reputation-management module may include spam verdicts and/or other reputation data associated with the email sender address. In some embodiments, reputation data may be received from one or more global reputation sources. Such global reputation sources may include, for example, external servers that collect and host reputation data associated with email senders addresses. Spam verdicts and/or other reputation data may be used to determine a likelihood that email sent from the email sender address constitutes spam or other undesirable email. In various examples, as will be described in greater detail below, a local mail-transfer agent may provide dynamic reputation data based on analysis of local email traffic.

A local reputation associated with an email sender address may be used to determine how a local mail-transfer agent, such as mail-transfer agent 206 in FIG. 2, handles and email sent from the email sender address to a local recipient. For example, an email sent from an email sender address that is associated with a negative local reputation may be inhibited from being sent to a local recipient by the local mail-transfer agent. In some examples, as will be described in greater detail below with reference to FIG. 5, a local reputation associated with an email sender address may comprise a policy that allows for sampling emails sent from the email sender address.

Turning back to the steps shown in FIG. 4, the reputation-management module may store a domain-name-system record associated with the local reputation on a domain-name system, such as domain-name systems 208 and 308 in FIGS. 2 and 3 (step 404). The domain-name system may be mail-transfer agent agnostic. In other words, the domain-name system may readily work with many existing types of mail-transfer agents, such as mail-transfer agents configured to send email-address-based queries to domain-name systems.

In some examples, a domain-name-system database, such as domain-name-system database 122 in FIG. 1, may comprise an index of email addresses. At least some of the email addresses may be associated with corresponding domain-name-system records. According to at least one embodiment, a domain-name-system record may indicate to a mail-transfer agent, such as mail-transfer agent 206, that an email sent from an email address associated with the domain-name-system record should or should not be sent to a local recipient. A domain-name-system record may be at least partially based on a local reputation for an email sender address. Accordingly, an email sender address associated with a relatively negative local reputation may likewise be associated with a relatively negative domain-name-system record.

As further shown in FIG. 4, an email-transfer module, such as email-transfer module 106 in FIG. 1, may identify one or more emails sent from the email sender address to one or more local recipients (step 406). For example, the email-transfer module may determine that an email has been sent to a local mail-transfer agent, such as mail-transfer agents 206 and 306 in FIGS. 2 and 3. The email-transfer module may also identify the address of the email sender.

Next, an email-analysis module, such as email-analysis module 108 in FIG. 1, may form a spam verdict for each of the one or more emails by analyzing contents of each of the one or more emails (step 408). According to various embodiments, a spam verdict formed by the email-analysis module may indicate whether or not a particular email constitutes spam. Various criteria and methodologies may be used to determine whether an email constitutes spam.

In some examples, the email-analysis module may scan the contents of the one or more emails to determine whether or not various characteristic identifiers indicative of spam emails are present in the one or more emails. The characteristic identifiers may be used by the email-analysis module to determine whether or not any of the one or more emails constitutes spam. In some embodiments, the email-analysis module may compare the contents of the one or more emails to a list of terms, phrases, and/or other characteristic identifiers indicative of spam. In additional embodiments, the email-analysis module may accept input from a computer user to identify spam emails. For example, a computer user may manually observe the contents of the one or more emails to determine whether the one or more emails constitute spam.

Turning to the steps shown in FIG. 4, the reputation-management module may be programmed to update the local reputation for the email-sender address based on the one or more spam verdicts. For example, the reputation-management module may combine the one or more spam verdicts with existing information associated with the email sender address to revise the local reputation. In additional embodiments, the reputation-management module may use the one or more spam verdicts to establish a new local reputation for the email-sender address.

By enabling the local reputation for the email-sender address to be updated based on additional information, such as spam verdicts, the reputation-management module may enable a negative local reputation for an email sender address to be rehabilitated in certain situations. Additionally, in some situations, the reputation-management module may change a previously positive local reputation to a negative local reputation based on an increase in spam sent from an email address associated with the local reputation.

Figure 5:
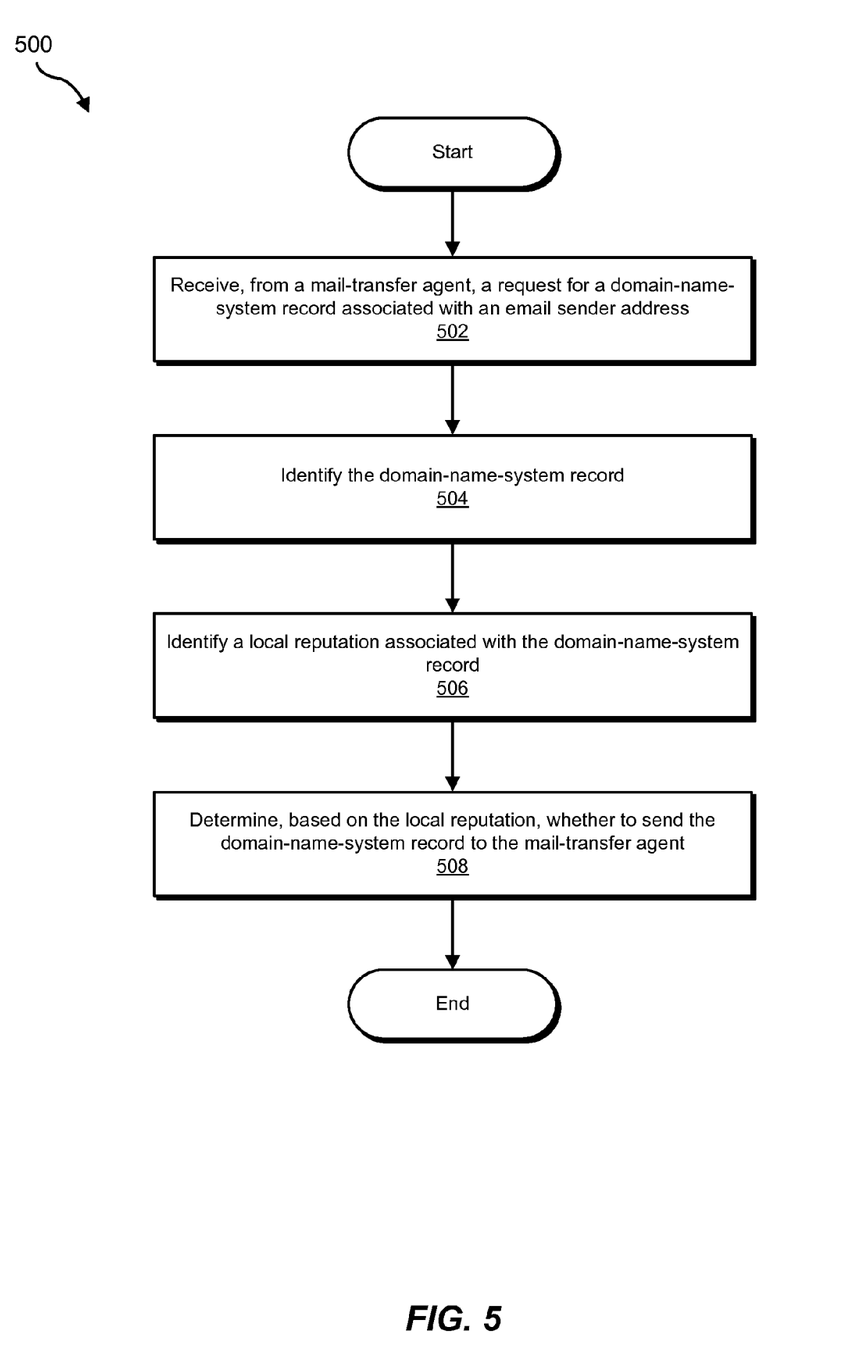
FIG. 5 is another flow diagram of an exemplary method for managing delivery of email to local recipients according to certain embodiments.

FIG. 5 is a flow diagram of an exemplary method for managing delivery of email to local recipients, according to additional embodiments. As shown, a reputation-management module, such as reputation-management module 104 in FIG. 1, may receive a request for a domain-name-system record associated with an email sender address (step 502). The request for the domain-name-system record may be received from a mail-transfer agent, such as mail-transfer agents 206 and 306 in FIGS. 2 and 3.

In some examples, the mail-transfer agent may submit a query to a domain-name system, such as domain-name system 208 in FIG. 2, requesting the domain-name-system record. Such a query may include information identifying an email sender address. For example, a query sent to a domain-name system may comprise an internet protocol address associated with an email sender (e.g., a internet protocol address associated with a domain in the email sender address). In some examples, the mail-transfer agent may receive an email from an external email sender. The email may be directed to a local recipient. Before sending the email to the local recipient or otherwise rejecting the email, mail-transfer agent may submit a query to the domain-name system requesting a system record associated with the email sender address.

In some examples, the mail-transfer agent may submit a query to a domain-name-system proxy, such as domain-name-system proxy 310 in FIG. 3. Domain-name-system proxy 310 may then send the query to the domain-name system. In some embodiments, the mail-transfer agent may direct the query to the domain-name system, and the domain-name-system proxy may intercept the query prior to the query reaching the domain-name system.

The reputation-management module may then identify the domain-name-system record (step 504). According to some embodiments, the domain-name-system record may be stored in a domain-name-system database, such as domain-name-system database 122 in FIG. 1. In various examples, the domain-name-system database may be located on a domain-name system, such as domain-name systems 208 and 308 and FIGS. 2 and 3. As described above, the domain-name system may be mail-transfer agent agnostic. In some examples, the domain-name-system database may comprise an index of email addresses, at least some of which may be associated with corresponding domain-name-system records. The domain-name-system records may be at least partially based on local reputations for associated email sender addresses.

Once the domain-name-system record has been identified, the reputation-management module may identify a local reputation associated with the domain-name-system record (step 506). The local reputation may be stored in any suitable location. For example, the local reputation may be stored on one or more of a domain-name system and/or the domain-name-system proxy. In some examples, the local reputation may be stored in a database, such as domain-name-system database 122. If the domain-name system identifies a domain-name-system record, as described above with reference to step 504, the domain-name system may send the domain-name-system record to the mail-transfer system. In some embodiments, the domain-name system may send the domain-name-system record to the domain-name-system proxy, and the domain-name-system proxy may then send the domain-name-system record to the mail-transfer agent.

Subsequently, the reputation-management module may identify the local reputation associated with the domain-name-system record. For example, the domain-name-system proxy may receive the domain-name-system record and the reputation-management module may identify a local reputation associated with the domain-name-system record, the local reputation being stored on the domain-name-system proxy. In additional embodiments, the local reputation may be stored on the domain-name system. As described above with reference to FIG. 4, the local reputation may be based at least in part on information about the email sender address that has been derived and/or compiled from local and/or external sources.

As further shown in FIG. 5, the reputation-management module may determine, based on the local reputation, whether to send the domain-name-system record to the mail-transfer agent (step 508). The local reputation may be used to determine how a local mail-transfer agent, such as mail-transfer agents 206 and 306 in FIGS. 2 and 3, handles an email sent from the email sender address to a local recipient. Determining whether to send the domain-name-system record to the mail-transfer agent may be performed at the domain-name system or at the domain-name-system proxy.

In some examples, a local reputation associated with an email sender address may comprise a policy that allows for sampling of emails sent from the email sender address to local recipients. The sampling of emails sent from the email sender address may be conducted using various sampling modulation techniques. The modulation techniques used to sample emails may be based on the local reputation of the email sender address as well as other criteria, such as the number of queries regarding a particular email sender address that are received from a mail-transfer agent.

In at least one embodiment, emails sent from the email sender address may be sampled according to a modulation technique in which a certain percentage of emails are sampled. For example, the local reputation may comprise a policy of sending the domain-name-system record to the mail-transfer agent in response to a specified percentage of requests for the domain-name-system record. For example, an email sender address that is associated with a relatively negative domain-name-system record may likewise be associated with a relatively negative local reputation. Accordingly, the local reputation may include a policy of sending the domain-name-system record on to the mail-transfer agent a majority of the time, while allowing for email sampling a certain portion of the time.

For example, the local reputation may comprise a policy of sending the domain-name-system record to a mail-transfer agent in response to 95% of all queries received from the mail-transfer agent requesting the domain-name-system record. In accordance with such a local reputation policy, the domain-name system or the domain-name-system proxy may send the domain-name-system record to the mail-transfer agent in response to 95% of queries received from the mail-transfer agent. Additionally, the domain-name system or the domain-name-system proxy may not send the domain-name-system record to the mail-transfer agent in response to 5% of queries received from the mail-transfer agent.

In additional embodiments, emails sent from the email sender address may be sampled according to a rate-limiting modulation technique in which emails are sampled based, at least in part, on internal tracking of the number of queries received that are associated with the email sender address. For example, a modulation technique for sampling emails may comprise a policy of sampling a certain percentage of emails sent from an email sender address until a certain threshold number of queries regarding the email sender have been received from a mail-transfer agent.

After the threshold number of queries has been met, the domain-name system or the domain-name-system proxy may not send the domain-name-system record to the mail-transfer agent for a specified period (e.g., a specified period of time and/or a specified number of queries). The threshold number of queries may vary based, at least in part, on the local reputation associated with the email sender address. For example, an email sender address associated with a relatively negative local reputation may have a higher threshold number.

According to various embodiments, when the mail-transfer agent does not receive a domain-name-system record in response to a request for a domain-name-system record associated with an email sender address, an email-analysis module, such as email-analysis module 108 in FIG. 1, may analyze the contents of one or more emails sent from the email sender address to determine whether or not the emails constitute spam. Various criteria and methodologies may be used to determine whether an email constitutes spam. In some examples, the email-analysis module may scan the contents of the one or more emails to determine whether or not various characteristic identifiers indicative of spam emails are present in the one or more emails.

Following analysis of the one or more emails, the domain-name system and/or the domain-name-system proxy may receive feedback information associated with the email sender address from the mail-transfer system. For example, the mail-transfer system may form a spam verdict for each of the one or more emails. In some examples, the spam verdicts may be used to determine whether the mail-transfer agent sends the emails to one or more local recipients. Additionally, the spam verdicts may be sent to the domain-name system and/or the domain-name-system proxy. The domain-name system and a domain-name-system proxy may use the spam verdicts to update the local reputation associated with the email sender address.

Figure 6:
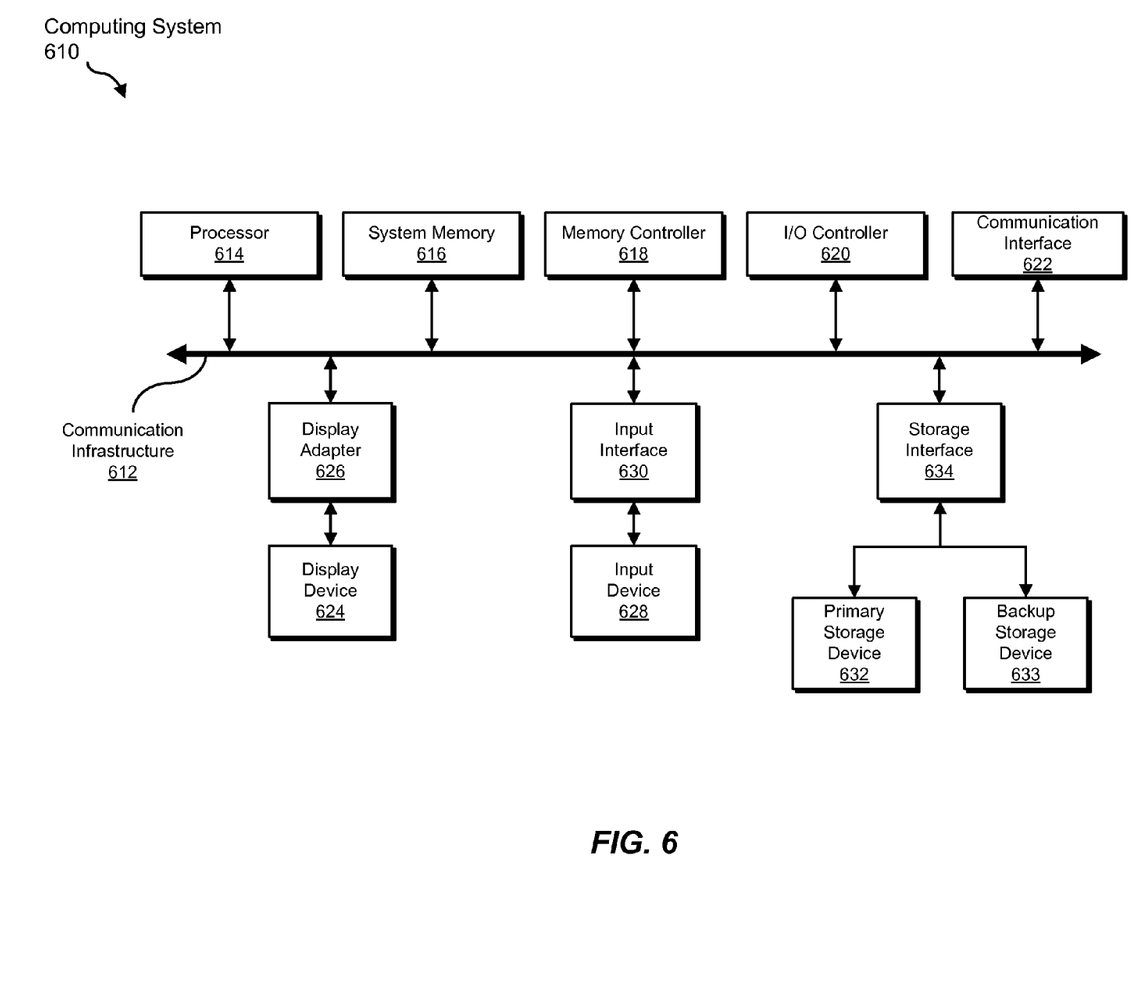
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the establishing, storing, identifying, forming, updating, determining, receiving, and responding steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as establishing, storing, identifying, forming, updating, determining, receiving, and responding.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the establishing, storing, identifying, forming, updating, determining, receiving, and responding steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the establishing, storing, identifying, forming, updating, determining, receiving, and responding steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the establishing, storing, identifying, forming, updating, determining, receiving, and responding steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the establishing, storing, identifying, forming, updating, determining, receiving, and responding steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
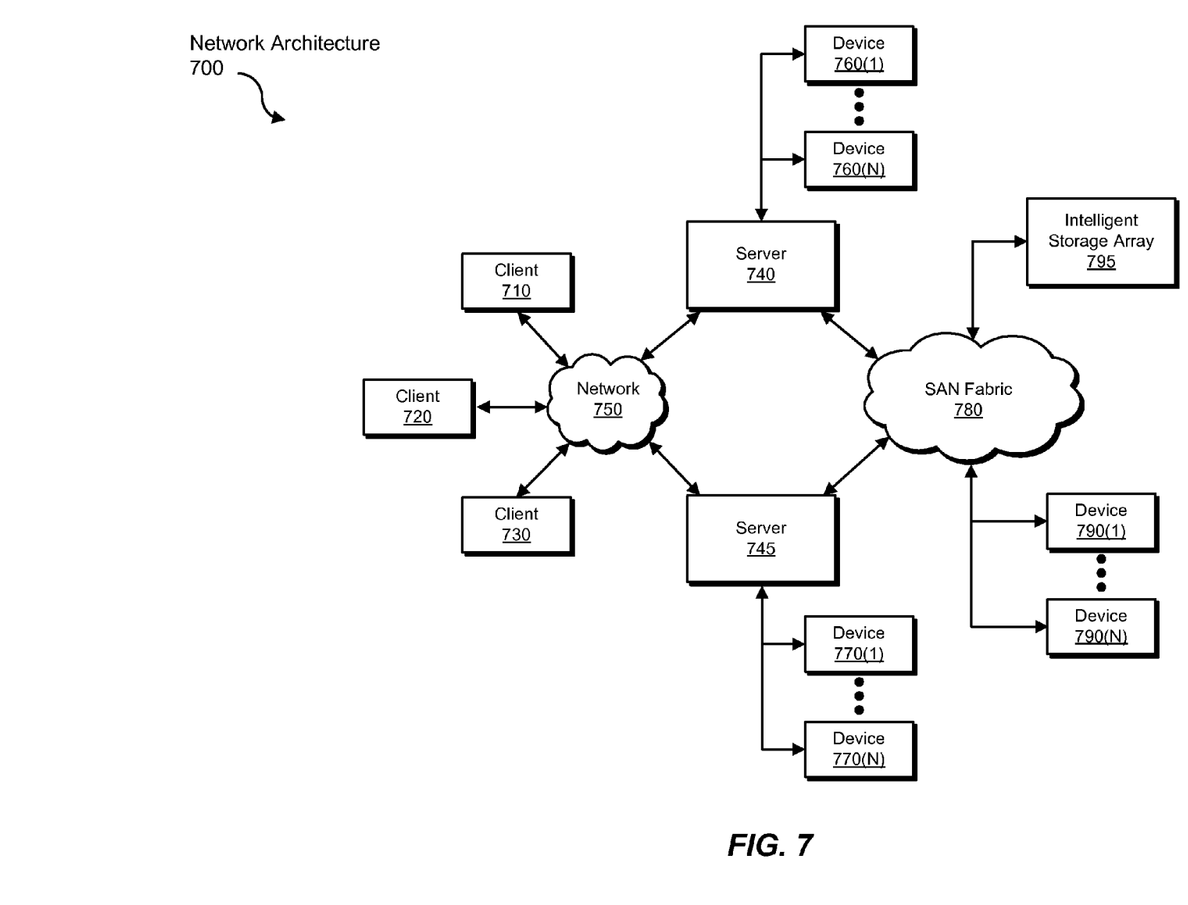
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the establishing, storing, identifying, forming, updating, determining, receiving, and responding steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary computer-implemented method for managing delivery of email to local recipients. The computer-implemented method may comprise: 1) establishing a local reputation for an email sender address, 2) storing a domain-name-system record associated with the local reputation on a domain-name system, the domain-name system being mail-transfer agent agnostic, 3) identifying one or more emails sent from the email sender address to one or more local recipients, 4) forming a spam verdict for each of the one or more emails by analyzing contents of each of the one or more emails, and 5) updating the local reputation for the email sender address based on the one or more spam verdicts.

In some embodiments, establishing the local reputation for the email sender address may comprise receiving reputation data from at least one global reputation source. In various embodiments, the computer-implemented method may additionally comprise: 1) receiving, from a mail-transfer agent, a request for a domain-name-system record associated with the email sender address, 2) identifying the domain-name-system record, 3) identifying the local reputation, and 4) determining, based on the local reputation, whether to send the domain-name-system record to the mail-transfer agent. The computer-implemented method may be tangibly embodied as computer-executable instructions on at least one computer-readable-storage medium According to some embodiments, a computer-implemented method for managing delivery of email to local recipients may comprise: 1) receiving, from a mail-transfer agent, a request for a domain-name-system record associated with an email sender address, 2) identifying the domain-name-system record, 3) identifying a local reputation associated with the domain-name-system record, and 4) determining, based on the local reputation, whether to send the domain-name-system record to the mail-transfer agent.

In some embodiments, the computer-implemented method may additionally comprise: 1) receiving, at a domain-name system, an internet protocol address of the domain name of the email sender address and 2) identifying the domain-name-system record on the domain-name system. Determining whether to send the domain-name-system record to the mail-transfer agent may be performed at the domain-name system.

According to various embodiments, the computer-implemented method may also comprise: 1) receiving, at a domain-name-system proxy, an internet protocol address of the domain name of the email sender address, 2) sending the internet protocol address from the domain-name-system proxy to a domain-name-system server, and 3) receiving, at the domain-name-system proxy, the domain-name-system record, the domain-name-system record being received from the domain-name-system server. Determining whether to send the domain-name-system record to the mail-transfer agent may be performed at the domain-name-system proxy. In various embodiments, the computer-implemented method may be tangibly embodied as computer-executable instructions on at least one computer-readable-storage medium.

In some embodiments, the computer-implemented method may comprise: 1) receiving feedback information associated with the email sender address and 2) updating the local reputation based on the feedback information. The feedback information may comprise information about the email sender address obtained by scanning content of at least one email sent from the email sender address. According to various embodiments, receiving, from the mail-transfer agent, the request for the domain-name-system record associated the email sender address may further comprise receiving, from one or more mail-transfer agents, a plurality of requests for the domain-name-system record associated with the email sender address.

According to some embodiments, the computer-implemented method may comprise: 1) responding to a first percentage of the plurality of requests by sending the domain-name-system record to the one or more mail-transfer agents and 2) responding to a second percentage of the plurality of requests by refraining from sending the domain-name-system record to the one or more mail-transfer agents. In various embodiments, the computer-implemented method may also comprise: 1) responding to a first percentage of the plurality of requests by sending the domain-name-system record to the one or more mail-transfer agents and 2) responding to a second percentage of the plurality of requests by refraining from sending the domain-name-system record to the one or more mail-transfer agents. In some examples, storing the domain-name-system record on a domain-name system, the domain-name system being mail-transfer again agnostic.

In some embodiments, the computer-implemented method may comprise: 1) identifying one or more emails sent from the email sender address to one or more local recipients, 2) forming a spam verdict for each of the one or more emails by analyzing contents of each of the one or more emails, and 3) updating the local reputation for the email sender address based on the one or more spam verdicts. According to various embodiments, receiving, from the mail-transfer agent, the request for the domain-name-system record associated the email sender address may be performed by at least one of the domain-name system and a domain-name-system proxy. According to some embodiments, the local reputation may comprise a policy of sending the domain-name-system record to the mail-transfer agent in response to a specified percentage of requests for the domain-name-system record.

According to various embodiments, a system for managing delivery of email to local recipients may comprise a domain-name-system database that stores a domain-name-system record associated with a local reputation for an email sender address, the domain-name-system database being located on a domain-name system that is mail-transfer agent agnostic. The system may also include a reputation-management module programmed to: 1) establish the local reputation for the email sender address, 2) receive, from a mail-transfer agent, a request for the domain-name-system record, 3) identify the domain-name-system record, 4) identify the local reputation, the local reputation being associated with the domain-name-system record, and 5) determine, based on the local reputation, whether to send the domain-name-system record to the mail-transfer agent.

The system may additionally comprise an email-transfer module programmed to identify one or more emails sent from the email sender address to one or more local recipients. The system may also comprise an email analysis module programmed to form a spam verdict for each of the one or more emails by analyzing contents of each of the one or more emails. In some embodiments, the reputation-management module may be programmed to update the local reputation for the email sender address based on the one or more spam verdicts.

According to some embodiments, the local reputation may comprise a policy of sending the domain-name-system record to the mail-transfer agent in response to a specified percentage of requests for the domain-name-system record. In various embodiments, the reputation-management module may be programmed to: 1) receive, at the domain-name system, an internet protocol address of the domain name of the email sender address and 2) identify the domain-name-system record on the domain-name system. In some embodiments, the reputation-management module may be programmed to: 1) receive, at a domain-name-system proxy, an internet protocol address of the domain name of the email sender address, 2) send the internet protocol address from the domain-name-system proxy to a domain-name-system server, and 3) receive, at the domain-name-system proxy, the domain-name-system record, the domain-name-system record being received from the domain-name-system server.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed. One or more of the steps disclosed herein may transform data and/or may transform a configuration of a storage device by modifying data on the storage device. For example, steps of the instant disclosure may transform a global reputation into a local reputation.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing delivery of email to local recipients, at least a portion of the method being performed by a computing system comprising at least one processor, the method comprising:
   establishing, at a domain-name system, a local reputation for an email sender address;
   storing a domain-name-system record associated with the local reputation on the domain-name system;
   receiving, at the domain-name system, from a mail-transfer agent as part of a mail-transfer system, a request for the domain-name-system record associated with the email sender address;
   determining, by the domain-name system and based on the local reputation, not to send the domain-name-system record associated with the email sender address to the mail-transfer agent;
   determining, by the mail-transfer system, that a response to the request was not received from the domain-name system;
   forming a spam verdict, by the mail-transfer system, of an email sent from the email sender address for which the mail-transfer system had failed to receive the domain-name-system record;
   transmitting, by the mail-transfer agent to the domain-name system, the spam verdict to the domain-name system as feedback;
   updating, by the domain-name system, the local reputation based on the spam verdict received from the mail-transfer agent after the mail-transfer agent failed to receive the domain-name-system record.

2. The computer-implemented method of claim 1, wherein: the domain-name system is mail-transfer agent agnostic.

3. The computer-implemented method of claim 1, wherein the determining not to send the domain-name-system record is based on the content of the local reputation.

4. The method of claim 1, wherein the mail-transfer system forms the spam verdict of the email by scanning content of the email to determine whether at least one characteristic identifier indicative of spam emails is present in the email.

5. A computer-implemented method for managing delivery of email to local recipients, at least a portion of the method being performed by a computing system comprising at least one processor, the method comprising:
   receiving, from a mail-transfer agent, a request for a domain-name-system record associated with an email sender address;
   identifying the domain-name-system record;
   identifying a local reputation associated with the domain-name-system record;
   determining, based on the local reputation, whether to send the domain-name-system record to the mail-transfer agent, wherein a negative local reputation is associated with a higher threshold number for sending the domain-name-system record, where the threshold number indicates a number of times for sending the domain-name-system record until refraining from doing so.

6. The computer-implemented method of claim 5, further comprising:
   receiving, at a domain-name system, an internet protocol address of the domain name of the email sender address;
   identifying the domain-name-system record on the domain-name system;
   wherein:
   determining whether to send the domain-name-system record to the mail-transfer agent is performed at the domain-name system.

7. The computer-implemented method of claim 5, further comprising:
   receiving, at a domain-name-system proxy, an internet protocol address of the domain name of the email sender address;
   sending the internet protocol address from the domain-name-system proxy to a domain-name-system server;
   receiving, at the domain-name-system proxy, the domain-name-system record, the domain-name-system record being received from the domain-name-system server;
   wherein:
   determining whether to send the domain-name-system record to the mail-transfer agent is performed at the domain-name-system proxy.

8. The computer-implemented method of claim 5, further comprising:
   receiving feedback information associated with the email sender address;
   updating the local reputation based on the feedback information.

9. The computer-implemented method of claim 8, wherein:
the feedback information comprises information about the email sender address obtained by scanning content of at least one email sent from the email sender address.

10. The computer-implemented method of claim 5, wherein:
receiving, from the mail-transfer agent, the request for the domain-name-system record associated with the email sender address further comprises:
receiving, from one or more mail-transfer agents, a plurality of requests for the domain-name-system record associated with the email sender address.

11. The computer-implemented method of claim 10, further comprising:
responding to a first percentage of the plurality of requests by sending the domain-name-system record to the one or more mail-transfer agents;
responding to a second percentage of the plurality of requests by refraining from sending the domain-name-system record to the one or more mail-transfer agents.

12. The computer-implemented method of claim 10, further comprising:
responding to a first number of the plurality of requests by sending the domain-name-system record to the one or more mail-transfer agents;
responding to a second number of the plurality of requests by refraining from sending the domain-name-system record to the one or more mail-transfer agents.

13. The computer-implemented method of claim 5, further comprising:
storing the domain-name-system record on a domain-name system, the domain-name system being mail-transfer agent agnostic.

14. The computer-implemented method of claim 13, wherein:
receiving, from the mail-transfer agent, the request for the domain-name-system record associated with the email sender address is performed by at least one of:
the domain-name system;
a domain-name-system proxy.

15. The computer-implemented method of claim 5, further comprising:
identifying one or more emails sent from the email sender address to one or more local recipients;
forming a spam verdict for each of the one or more emails by analyzing contents of each of the one or more emails;
updating the local reputation for the email sender address based on the one or more spam verdicts.

16. The computer-implemented method of claim 5, wherein:
the local reputation comprises a policy of sending the domain-name-system record to the mail-transfer agent in response to not more than a specified percentage of requests for the domain-name-system record.

17. A system for managing delivery of email to local recipients, the system comprising:
a domain-name-system database that stores a domain-name-system record associated with a local reputation for an email sender address, the domain-name-system database being located on a domain-name system;
a reputation-management module programmed to:
establish the local reputation for the email sender address;
receive, from a mail-transfer agent, a request for the domain-name-system record;
identify the domain-name-system record;
identify the local reputation, the local reputation being associated with the domain-name-system record;
determine, based on the local reputation, whether to send the domain-name-system record to the mail-transfer agent, wherein a negative local reputation is associated with a higher threshold number for sending the domain-name-system record, where the threshold number indicates a number of times for sending the domain-name-system record until refraining from doing so;
an email-transfer module programmed to identify one or more emails sent from the email sender address to one or more local recipients;
an email analysis module programmed to form a spam verdict for each of the one or more emails by analyzing contents of each of the one or more emails;
wherein the reputation-management module is programmed to update the local reputation for the email sender address based on the one or more spam verdicts;
one or more processors configured to execute the reputation-management module, the email-transfer module, and the email analysis module.

18. The system of claim 17, wherein:
the local reputation comprises a policy of sending the domain-name-system record to the mail-transfer agent in response to not more than a specified percentage of requests for the domain-name-system record.

19. The system of claim 17, wherein the reputation-management module is programmed to:
perform a modulation technique by sending the domain-name-system record until the threshold number has been reached and then refraining from sending the domain-name-system record for a specified period.

20. The system of claim 17, wherein the reputation-management module is programmed to:
receive, at a domain-name-system proxy, an internet protocol address of the domain name of the email sender address;
send the internet protocol address from the domain-name-system proxy to a domain-name-system server;
receive, at the domain-name-system proxy, the domain-name-system record, the domain-name-system record being received from the domain-name-system server.

\* \* \* \* \*